US011909041B2

(12) United States Patent
Zou et al.

(10) Patent No.: US 11,909,041 B2
(45) Date of Patent: Feb. 20, 2024

(54) METHOD TO PRODUCE CATHODE MATERIALS FOR LI-ION BATTERIES

(71) Applicant: Tesla, Inc., Palo Alto, CA (US)

(72) Inventors: Feng Zou, Mississauga (CA); Yang Liu, Mississauga (CA)

(73) Assignee: Tesla, Inc., Austin, TX (US)

( * ) Notice: Subject to any disclaimer, the term of this patent is extended or adjusted under 35 U.S.C. 154(b) by 399 days.

(21) Appl. No.: 16/976,788

(22) PCT Filed: Apr. 3, 2019

(86) PCT No.: PCT/CA2019/050403
§ 371 (c)(1),
(2) Date: Aug. 31, 2020

(87) PCT Pub. No.: WO2019/191837
PCT Pub. Date: Oct. 10, 2019

(65) Prior Publication Data
US 2021/0013507 A1    Jan. 14, 2021

Related U.S. Application Data

(60) Provisional application No. 62/652,516, filed on Apr. 4, 2018.

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/42* (2013.01); *H01M 10/0525* (2013.01);
(Continued)

(58) Field of Classification Search
CPC .................................................. H01M 4/525
See application file for complete search history.

(56) References Cited

U.S. PATENT DOCUMENTS

| 5,264,201 A | 11/1993 | Dahn |
| 5,447,707 A * | 9/1995 | Babjak .................... H01M 4/52 423/594.19 |

(Continued)

FOREIGN PATENT DOCUMENTS

| CA | 2098262 | 12/1993 |
| CA | 2394146 | 7/2001 |

(Continued)

OTHER PUBLICATIONS

International Search Report Issued in parent PCT/CA2019050403, dated Jun. 11, 2019, pp. 1-3.

(Continued)

*Primary Examiner* — Peter F Godenschwager
(74) *Attorney, Agent, or Firm* — Knobbe Martens Olson & Bear, LLP

(57) ABSTRACT

This invention provides an environmental friendly method for the production of high capacity cathode materials for use in Li-ion batteries. Traditional methods for producing lithium mixed metal oxide cathode materials typically generate large amounts of effluent which effluent must be treated prior to discharge. The present process uses mixed metals as raw materials, in a wet chemical reaction with an oxidant, in order to make high-quality metal hydroxide precursors which can be used to prepare high-quality cathode materials after lithiation. As a key feature, in the precursor preparation process, the bulk of the aqueous solution used for the wet chemical reaction can be recycled back to the reactor, so that the total process has little or no effluent generated during production of the cathode precursor material.

20 Claims, 3 Drawing Sheets

(51) Int. Cl.
*H01M 10/0525* (2010.01)
*H01M 4/02* (2006.01)

(52) U.S. Cl.
CPC ...... *C01P 2002/52* (2013.01); *C01P 2002/72* (2013.01); *C01P 2004/03* (2013.01); *C01P 2006/40* (2013.01); *H01M 2004/028* (2013.01)

(56) References Cited

U.S. PATENT DOCUMENTS

| | | |
|---|---|---|
| 2006/0073091 A1 | 4/2006 | Zou |
| 2012/0028128 A1 | 2/2012 | Seino et al. |

FOREIGN PATENT DOCUMENTS

| | | | |
|---|---|---|---|
| CA | 2521422 | 11/2004 | |
| CN | 102219265 | 10/2011 | |
| CN | 104409723 | 3/2015 | |
| EP | 0 388 808 | 9/1990 | |
| JP | 10-324524 | 12/1998 | |
| JP | 2002-170562 | 6/2002 | |
| JP | 2016-143539 | 8/2016 | |
| JP | 2017-199561 | 11/2017 | |
| JP | 2018-016519 | 2/2018 | |
| WO | WO-0148842 A1 * | 7/2001 | ........ H01M 10/0525 |
| WO | WO 12/020768 | 2/2012 | |
| WO | WO 16/075533 | 5/2016 | |

OTHER PUBLICATIONS

Written Opinion Issued in parent PCT/CA2019050403, dated Jun. 11, 2019, pp. 1-12.

Huaquan Lu et al: "High capacity Li[Ni08Co01Mn01]O2 synthesized by sol-gel and co-precipitation methods as cathode materials for lithium-ion batteries", Solid State Ionics, vols. 249-250, Nov. 1, 2013, pp. 105-111.

Ching-Hsiang Chen et al: "Electrochemical performance of layered Li[NixCo12xMnx]O2 cathode materials synthesized by a sol-gel method", Journal of Power Sources, 146, 2005, 626-629.

* cited by examiner

METHOD TO PRODUCE CATHODE MATERIALS FOR LI-ION BATTERIES

FIELD OF THE INVENTION

This invention relates to a method for producing cathode materials for Li-ion batteries. In particular, the provided method relates to relatively effluent free production of such cathode materials when compared to incumbent industrial methods.

BACKGROUND OF THE INVENTION

Rechargeable Li-ion batteries have been used in a number of different types of devices as an energy storage component. These devices include mobile-phones, portable computers, wireless power tools, hybrid and pure electric automobiles, and the like. In recent years, the demand for higher-output Li-ion batteries has increased dramatically especially with the rapid market growth of electric automobiles. The major components in a lithium-ion battery include an anode, a cathode, and electrolyte. During its charge and discharge cycles, lithium ions are shuttled between the anode and cathode active materials through the electrolyte. Due to its limited specific-capacity, and its high cost of production and raw materials, the cathode active material is usually the most expensive component in the Li-ion batteries. Therefore, selection of the cathode active material is critical for improving the performance of, and lowering the cost of, Li-ion batteries. This is particularly true in automotive applications in view of the expected phenomenal growth in this area in the next two decades.

Currently lithium mixed metal oxides, which contain mostly nickel, cobalt, manganese, and/or aluminum with other necessary dopants, are the main components used for the production of cathode active materials with high performance. The demand and production of such materials continues to increase significantly.

Incumbent industrial methods to produce these high performance cathode materials, such as lithium mixed metal oxides, includes two major steps, namely a precursor production step and a lithiation step. In the current process, the precursor step starts with the use of mixed metal sulphates, which are dissolved in water to form an aqueous solution. This solution is mixed with an alkaline solution, typically consisting of a mostly sodium hydroxide solution, in an agitated reactor to perform a co-precipitation reaction. The reaction can be described with the following chemical equation:

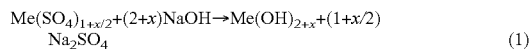

$$Me(SO_4)_{1+x/2} + (2+x)NaOH \rightarrow Me(OH)_{2+x} + (1+x/2)Na_2SO_4 \quad (1)$$

where $Me(OH)_{2+x}$ is the desired precursor in solid form in the reaction system, Me represents mixed metal ions with various valences, and x is a factor to provide for a charge balance between anions and cations.

A filtration operation is normally carried out to separate the solid from the liquid. The solid precursor obtained after the filtration is then mixed with lithium containing compounds and the resultant mixture is calcined in a furnace to produce a final lithium mixed metal oxide material which is to be used as a cathode active material.

However, due to the limited solubility of $Me(SO_4)_{1+x/2}$ and NaOH, these co-precipitation processes typically generate significant amounts of a $Na_2SO_4$-containing solution after removal of the solid portion with the filtration process. Because it contains $Na_2SO_4$, the collected solution cannot be reused in the reaction system and thus, must be treated as an effluent.

In addition, ammonia is commonly added to the reaction system, as a chelating agent, in order to assist in providing the correct physical properties of the precursor materials. Therefore, besides the salts (such as sodium sulphate in most of the cases), the effluent can also contain ammonia, ammonium, dissolved heavy metals, small solid particles, and the like. This effluent usually has to be treated to remove ammonia and sodium sulphate before it can be discharged to the environment or recycled to the reaction system. This effluent treatment is very costly with a significant amount of energy consumption. Moreover, due to its limited industrial application and demand, sodium sulphate is generally considered as a solid waste after the treatment of the effluent, and thus provides little or no added value.

Currently, there are several methods proposed to attempt to avoid effluent generation. For example, Chinese Patent CN104409723B granted in 2016 discloses an electrochemical preparation method using a lithium mixed metal oxide for the production of the cathode active material in lithium ion batteries. According to this method, pure nickel, cobalt and manganese metals are used as raw materials, and a green electrochemical synthesis method is used to synthesize nickel, cobalt and manganese salt compounds utilizing electrolysis (at normal pressure and normal temperature). A ternary anode material ($LiNi_xCo_yMn_zO_2$, wherein x is greater than 0 and less than 1, y is greater than 0 and less than 0.8, z is greater than 0 and less than 1, and x+y+z is equal to 1) can be obtained after a lithium addition reaction, spray-drying the mixture, and conducting a high-temperature treatment. According to the description of the patent, the disclosed electrochemical preparation method can be used for reducing the cost of raw materials and energy consumption, simplifying the process, reducing environmental pollution, and improving the product performances, when compared with traditional processes.

As such, the electrochemical synthesis technology adopted by this method purports to provide an environmentally-friendly chemical process, wherein pure metals are used as anode materials (with no impurities introduced), so that the concentration controllability and the high purity of nickel ions, cobalt ions and manganese ions can be essentially guaranteed. Also, zero emission of wastewater to the environment is claimed, and a continuous large-scale production method, with little effluent can be realized. However, because organic acids such as acetic acid and citric acid are used in the process, significant amounts of carbon dioxide gas are generated during the calcination operation and the quality of final product (e.g. product density) can be a problem. Also, it is expected that there would be a significant energy consumption required during the spray drying operation in order to evaporate the water present in the system.

A similar method may be found in Chinese patent CN102219265A (2011), in which nitrate is used instead of organic acid and thermal decomposition is carried out at high temperature in a controllable atmosphere.

Another way to make Lithium mixed metal oxide for lithium ion batteries, without significant effluent generation is the "sol-gel" method described by Ching-Hsiang Chen et al. in their paper in the Journal of Power Sources 146; 626-629 (2005). In this approach, layered $LiNi_xCo_{1-2x}Mn_xO_2$ powders were synthesized by a sol-gel method using citric acid as a chelating agent. Stoichiometric amounts of lithium acetate, manganese acetate, and nickel acetate and cobalt nitrate are chosen as the starting materials used to prepare the precursor. All of the salts were dissolved in an appropriate quantity of distilled water and citric acid was added drop-wise with continuous stirring. After dissolution of all salts, the temperature of solution was raised to 80-90° C. and stirring was continued until a clear viscous gel was formed. The gel was vacuum dried at 120° C. for 2 hours to obtain the precursor powder. The precursor powder was decomposed at 450° C. in oxygen stream for 4 hours and ground to fine powder and calcined at 900° C. for 12 hours under oxygen flowing condition. The heating and cooling rate was maintained at 2° C. per minute.

Again, this method would be expected to have high energy consumption and poor density of the final material because significant amounts of water would be needed to be evaporated, and, in addition, organic acids and/or nitrates must be involved in, and decomposed during, the calcination.

A further paper published by Huaquan Lu et al. in Solid State Ionics; 249-250, (2013), 105-111, also describes a method to make lithium mixed metal oxide using the sol-gel method, in which only nitrate was used instead of a mixture of organic salts and nitrate. However, it suffers from essentially the same problems as the previous sol-gel method.

To address these issues, it would be advantageous, and an objective of the present invention, to provide a process for the production of cathode material for a battery, and a lithium-ion battery in particular, which process would ameliorate and/or resolve the above described effluent issues from the currently known processes for making lithium mixed metal oxide. As such, it would be desirable to provide a suitable process having little or no effluent generation. That is, the desired process would provide a system wherein essentially the entire liquid portion from the reaction is, or can be recycled completely to the reaction system, without any significant treatment. Additionally, in the desired process, there would be little or no need to evaporate water and/or decompose organics or nitrates, during a final high temperature treatment/calcination process.

SUMMARY OF THE INVENTION

The advantages set out hereinabove, as well as other objects and goals inherent thereto, are at least partially or fully provided by the process of the present invention, as set out herein below.

Accordingly, in a first aspect, the present invention provides a chemical process to produce lithium mixed metal oxide as cathode active materials for use in lithium ion secondary batteries. The process includes two major steps, namely, a wet chemical process for fabricating precursor, and a solid-state reaction, called "lithiation", for making the final cathode materials.

In the process of the present invention, raw materials, which preferably are mostly in metallic form, are introduced into an aqueous reaction system. At least one oxidant, such as oxygen, nitrates, nitric acid, and the like, are introduced into the aqueous reaction system in order to react with the metals, and thereby form metal hydroxides.

In operation, the reaction system typically comprises at least one agitated mixing tank, and/or reactors, in which an aqueous slurry of the reactants and resulting products are mixed. A portion of the slurry is removed, and any unreacted raw material metals are preferably removed from the slurry, and recycled to the reactors. In this respect, the tanks or reactors can be, where necessary, fitted with separation devices, such as magnetic separation devices, in order to remove and recycle the unreacted metal raw materials, from the oxidized metal hydroxides. After recycling of the unreacted metals, a solid and liquid separation operation is conducted on the remaining slurry. The liquid filtrate portion from this filtration is preferably recycled to the reaction system, for further reaction. The solid portion is collected and removed as the precursor material. The collected precursor material is then subjected to the lithiation stage.

It should be noted that order to initiate the reaction system, an artificial "seed" portion, which preferably has essentially the same or similar desired metal hydroxide compositions as the collected precursor material, can be prepared and used for the start-up of the reaction.

Also, an artificial solution with the same or similar compositions as the desired filtrate liquid, can also be prepared and used for the start-up of the reaction until a suitable filtrate is generated from the filtration system.

In the lithiation stage, the final cathode active materials are obtained by mixing the solid portion precursor materials produced hereinabove, with lithium containing compounds, and optionally other dopants, and then performing a calcination treatment. This can be followed by additional surface treatments, if required, and optional additional calcination treatments (if desired).

Thus, in its preferred form, the present invention provides a process to produce lithium mixed metal oxide as cathode active materials for use in the production of lithium ion batteries which process comprises two major steps, namely a precursor preparation step and lithiation step, wherein:

A) in the precursor preparation step, selected metals in their solid metallic form are added to an agitated reaction system containing a mixture of said solid metal particles, and optionally seed mixed metal hydroxide particles, in an aqueous solution, together with at least one oxidant, preferably selected from oxygen, metal nitrates, and nitric acid, or combinations thereof, which oxidants are introduced into the reactor, to effect oxidation of the metal particles, under alkaline conditions, wherein the overall oxidation reaction is represented by the following equation:

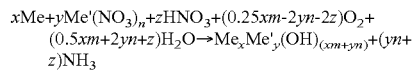

$$x\text{Me} + y\text{Me}'(\text{NO}_3)_n + z\text{HNO}_3 + (0.25xm - 2yn - 2z)\text{O}_2 + (0.5xm + 2yn + z)\text{H}_2\text{O} \rightarrow \text{Me}_x\text{Me}'_y(\text{OH})_{(xm+yn)} + (yn+z)\text{NH}_3$$

where Me represents at least one metal in metallic form, selected from a group consisting of nickel, manganese, cobalt, aluminum, and magnesium; Me' represents at least one metal in their ionic form selected from a group consisting of nickel, manganese, cobalt, aluminum, magnesium, zirconium, yttrium, titanium, vanadium, and molybdenum; $\text{Me}_x\text{Me}'_y(\text{OH})_{(xm+yn)}$ represents the resultant precursor product; x and y are the mole fraction of the metals Me and Me', respectively, m is the mole weighted average chemical valence of the mixed metals Me in the precursor product, n is the mole weighted average chemical valence of the mixed metals Me' in ionic form in the reactants, z is the mole fraction of $\text{HNO}_3$ introduced into the reaction system; $xm \geq 8yn + 8z$, $x+y=1$, $1 \geq x > 0$, $y \geq 0$, $z \geq 0$, and wherein a resultant slurry from the oxidation reaction is taken from the reactor, the unreacted metals are removed from the slurry and recycled to the reaction system, and a solid and liquid separation is carried out afterwards, in which the solid material collected is used as the collected precursor product and the liquid material is recycled directly to the reaction system, preferably without any treatment; and B) a lithiation step, wherein the collected precursor product is mixed with lithium containing compounds, and optionally other dopants, to produce a final mixture, followed by calcining the final mixture to obtaining the cathode active material.

As a result, the present invention thus provides a process for making lithium mixed metal oxides, while having little or no effluent generation. That is, the present invention provides a system wherein essentially the entire liquid portion from the reaction is, or can be recycled completely to the reaction system, without any effluent treatment.

Additionally, there is little or no need to evaporate water and/or decompose organic acids or nitrates, during a final high temperature treatment and/or in the calcination process.

In an additional feature, it can be noted that while the process of the present invention can be conducted in a batch process, the process is particularly well suited to be conducted in an essentially continuous process.

In a second aspect, the present invention also provides a cathode material precursor product, wherein suitable cathode material precursors of the present invention are produced by the above process, and wherein, in particular, these particles are preferably produced in a continuous process, preferably in a single stage reaction system, in the manner described herein, with respect to the present invention. The present invention also provides for the final cathode active materials, when produced by the process described herein, with respect to the present invention, and to the cathodes produced therefrom.

In a third aspect, the present invention also provides a battery, wherein the cathode of the battery is produced by the chemical process hereinabove described, with respect to the present invention.

DETAILED DESCRIPTION OF THE INVENTION

It is well-known that metal oxides or hydroxides can be formed from corrosion processes, e.g. metal oxidation in an aqueous solution or under moisture conditions. This principle is preferably used in the first step of the present invention in order to produce the precursor hydroxide materials from pure metals, in which metal corrosion/oxidation reactions, and the co-precipitation reactions, occur simultaneously, and preferably, inside the same reactor. The overall reaction is shown as following equation:

$$x\text{Me} + y\text{Me'}(NO_3)_n + z\text{HNO}_3 + (0.25xm-2yn-2z)O_2 + (0.5xm+2yn+z)H_2O \rightarrow \text{Me}_x\text{Me'}_y(OH)_{(xm+yn)} + (yn+z)NH_3$$

where Me represents at least one selected metal, preferably in solid metallic form, selected from the group consisting of nickel, manganese, cobalt, aluminum, and magnesium; Me' represents at least one metal, preferably in their ionic form, selected from the group consisting of nickel, manganese, cobalt, aluminum, magnesium, zirconium, yttrium, titanium, vanadium, and molybdenum; $\text{Me}_x\text{Me'}_y(OH)_{(xm+yn)}$ represents the precursor product; x and y are the mole fraction of the metals Me and Me', respectively, wherein m is the mole weighted average chemical valence of the mixed metals Me in the precursor product, n is the mole weighted average chemical valence of the mixed metals Me' in ionic form in the reactants, and z is the mole fraction of $HNO_3$ introduced into the reaction system; and wherein $xm \geq 8yn+8z$, $x+y=1$, $1 \geq x > 0$, $y \geq 0$, $z \geq 0$.

Oxygen is preferably used as the oxidant, since if used, it will typically not produce any significant by-products during the reaction. The oxygen can either be provided from a pure oxygen source and/or as oxygen which is contained in other gases, e.g. oxygen in air.

Some metal nitrates may be included as oxidants for use with metal elements which are not easily reacted with oxygen, or for metal elements which are not easily handled during processing operations, such as during agitation for uniform mixing, or during magnetic separation of their metallic form.

Nitric acid can be used as an additional oxidant, in order to control the co-precipitation reaction of metal nitrate. Ammonia is the only by-product when nitrate and nitric acid is used. However, the ammonia produced in the reaction is in its gaseous form and thus will not stay in the reaction system during the operation. Therefore, in the wet chemical process described above for making the precursor, there are no additional or new chemicals added to the liquid after the solid and liquid separation has occurred. As such, the liquid can be directly recycled, up to at least 75%, and more preferably, up to at least 90%, and still more preferably, up to 100%, to the reaction system without any adverse effects on the overall reaction.

The generated ammonia gas can be collected as a useful chemical or chemical precursor for other industries, such as, for example, the fertilizer industry.

Other oxidants might be used depending on the reactor conditions.

To obtain a high-quality product with consistent properties, it is preferable to operate the presently described reaction in a continuous mode, in which the reaction will reach a steady-state condition. This provides for better control of the resultant chemical compositions. In one preferred approach, an artificial solution with the same or similar compositions as the liquid in the reaction system, is prepared and used for the start-up of the reaction, and this artificial solution is used until the liquid generated from the solid and liquid separation operation, is similar to the artificial solution.

The pH of the reacting slurry is preferably in the range of 7.5 to 13, and more preferably, in the range of 8 to 12. The pH of the solution can be preferably adjusted by adding either an acid selected from sulphuric acid, nitric acid, or acetic acid and/or by adding an alkaline material selected from lithium hydroxide or oxide, sodium hydroxide or oxide, potassium hydroxide or oxide, and ammonia. Preferably, pH adjustment is done by adding an acid such as sulphuric acid or nitric acid, and/or by adding an alkaline material, such as lithium hydroxide, or sodium hydroxide, to the reaction mixture. In general, it should be noted that lower pH values may cause low quality of the co-precipitation product while higher pH values may cause passivation of metals during the corrosion reaction.

The preferred reaction temperature is in the range of from 20° C. to the boiling point of the reacting slurry, or more preferably, from 20° C. to 100° C. Still more preferably, the reaction temperature is in the range of 30° C. to 80° C.

Maintaining acceptable electrical conductivity of the reacting system can also be important for control of the corrosion/oxidation reactions. Therefore, the reacting slurry should preferably also contain dissolved salts to form an electrolyte for conductivity. These salts may include salts such as sulphate salts, acetate salts, nitrate salts, chloric salts, and the like, with cations selected from sodium, lithium, potassium, and ammonium. The salts are typically and preferably reusable within the recycled liquid collected after the liquid and solid separation.

The reacting slurry can also contain dissolved complexing agents, such as a mixture of ammonia and ammonium, which can chelate with the metal ions in the aqueous solution. The overall function of these complexing or chelating agents is to preferably control the properties of the co-precipitation products, and/or to make the metals more active for the corrosion reaction.

The method for producing cathode materials can also include a step wherein the unreacted raw material metals which are collected from the slurry by, for example, a magnetic separation step, can be "reactivated". This can include milling and/or washing of these materials with a typically lowered pH liquid obtained from the liquid and solid separation step.

Further, the method can also include a step wherein solid particles with the same or similar compositions as the precursor product, but with a smaller particle size than the precursor product, are introduced into the reaction system at the beginning of the reaction, and/or during the reaction.

The invented process can thus be preferably used to produce compositionally similar particles of cathode material precursors to those in the prior art, with uniform elemental distribution inside of each particle, wherein the metals are added in a steady, continuous process in a single stage reaction system. The process can, however, also be applied to produce particles with non-uniform elemental distribution inside each particle, such as compositionally gradient or layered particles of cathode material precursors in a multi-stage reaction system, by adding different metals at different times. In such a multi-stage system, each stage can deposit a layer of materials with varied composition for different functions. For example, the core area of the cathode material particle can be nickel rich for higher capacity, while the surface area might be manganese, magnesium, or aluminum rich for stable interface with the electrolyte found in a lithium ion battery.

Thus, the process provides a system wherein the metals are added continuously at the same ratio at all times to produce a precursor with uniform element distribution in each particle, or wherein the metals are added continuously at different ratios with time, in order to produce a precursor having non-uniformed element distribution in each particle.

The final cathode active materials to be produced in the present invention, are then finally obtained by mixing the precursor compounds with lithium containing compounds, and performing a calcination reaction, which can be optionally followed by surface treatment, if required. This process is normally called lithiation, and this lithiation process is typically conducted as a solid-state reaction at temperatures preferably between 600° C. and 1100° C., depending on the chemical composition of the final materials. In the lithiation reaction step, oxidation conditions may also be required as part of the process. Air, oxygen and nitrate are preferably used as the oxidants.

In the majority of applications, lithium hydroxide, with or without crystallized water, and lithium carbonate are preferably used as the lithium source.

After lithiation, slight crushing/milling can be required in a size reduction operation, in order to break the loose agglomerates formed during the lithiation step. Then, optional surface treatments, such as washing to remove extra lithium hydroxide/carbonate and other impurities as well as coating are sometimes needed or desired, for stabilizing the surface of the material. Thus, the cathode material can be subjected to further treatment after calcination, wherein such further treatment includes washing for removal of extra lithium and other unnecessary impurities, and coating of said cathode material for better performance of the cathode material during battery production and/or battery application. A further, optional calcination step may also be performed, if necessary or desired.

BRIEF DESCRIPTION OF THE DRAWINGS

The process of the present invention will now be described by way of example only, in association with the accompanying drawings, in which.

In the drawings, like reference numerals depict like elements.

The novel features which are believed to be characteristic of the present invention, as to its structure, organization, use and method of operation, together with further objectives and advantages thereof, will be better understood from the following examples, in which a presently preferred embodiment of the invention will now be illustrated by way of example only.

It is expressly understood, however, that the examples and drawings are for the purpose of illustration and description only and are not intended as a definition of the limits of the invention. Also, unless otherwise specifically noted, it should be understood that all of the features described herein may be combined with any of the above aspects, in any combination.

EXAMPLES

The process of the present invention, and the nature of the resultant materials, in accordance with preferred embodiments of the present invention, are described in the following examples.

Example 1

Figure 4:
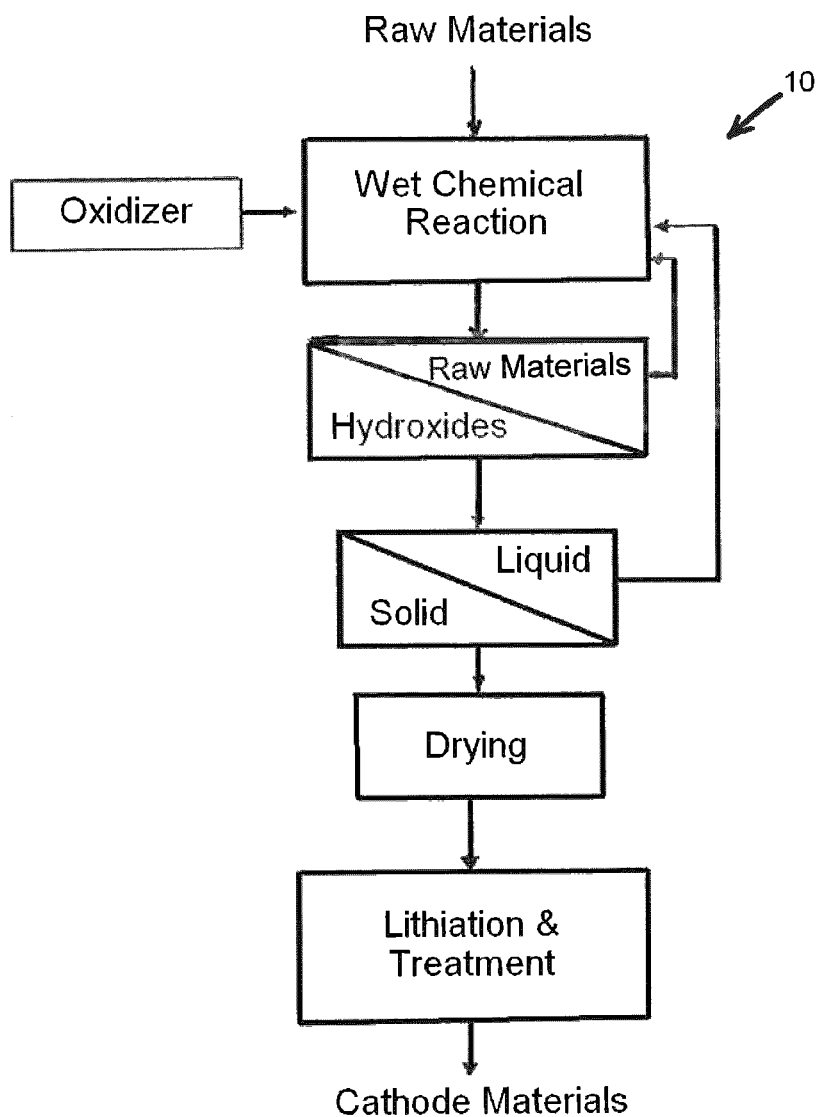
FIG. 4 is a process block diagram showing one preferred embodiment of the process of the present invention.

In accordance with the production process generally shown as 10, in FIG. 4, an aqueous solution of 1.1 L aqueous solution was prepared and transferred into a 2 liter reaction vessel with an agitation and heating systems. The aqueous solution contained 1 mole of sodium sulphate, as an electrolyte, and 50 mL of a 28% ammonia solution, as a complexing agent. The solution was agitated at a stir speed of about 750 rpm, while the solution was heated to a temperature of 60° C. About 150 grams of a mixed metal hydroxide powder was added into the reaction vessel, as a seed component, wherein the metal hydroxide powder contained mostly nickel hydroxide and a very small amount of cobalt hydroxide (less than 5% cobalt on a metal molar weight ratio).

The pH of the aqueous solution was adjusted to 10.5 by adding ammonia and sodium hydroxide into the reaction vessel. A further amount of 87 grams nickel metal powder, and 13 grams cobalt metal powder were also added to the reaction vessel. After about 60 minutes, further amounts of about 7.2 grams nickel powder and 1.08 grams cobalt powder were added to the reaction vessel every 60 minutes. This forms the raw materials for this reaction.

Also, oxygen gas, as oxidizer, was continuously introduced into the reaction vessel at a flow rate of about 26.5 mL per minute.

Every hour, about 50 mL of the resultant slurry in the reaction vessel was collected, and this collected slurry was subjected to a magnetic separation process in order to separate the magnetic, unreacted raw material metals, from the metal hydroxides. The magnetic, unreacted raw material metals from this separation were returned to the reaction vessel. The non-magnetic solid portion was then filtered from the remaining slurry, and washed with water. All of the remaining liquid filtrate, together with the wash water, was returned to the reaction vessel.

The resulting solid portion from the filtration step, as the chemical precursor for use in the present invention, was then dried at about 100° C. for about five hours.

Figure 1:
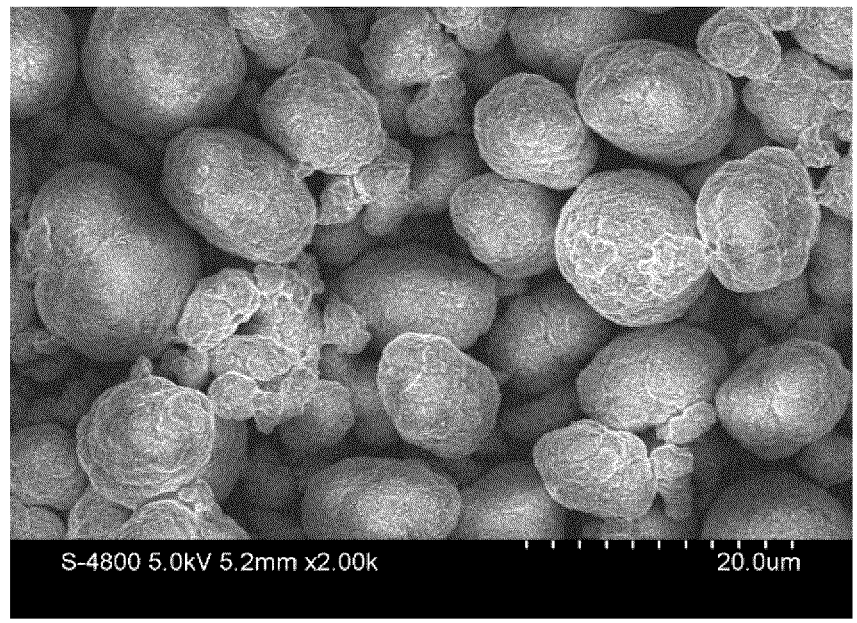
FIG. 1 is a SEM image for the precursor material produced using the invented process.

The operations described above were repeated continuously for 100 hours. After steady-state conditions were reached, the dried solid material from the final 24 hours of operation was collected as a sample of good precursor material. The particle size D50 of the collected precursor material was about 10 micrometers. The tap density of the collected precursor material was about 2.1 g/cm$^3$, and a Scanning Electron Microscope (SEM) image, as shown in FIG. 1, showed spherical shaped particles with fine primary particles.

Chemical analysis results indicated that the chemical composition of the product eventually reached a steady state with the targeted element molar ratio of Ni:Co=0.87:0.13.

Figure 2:
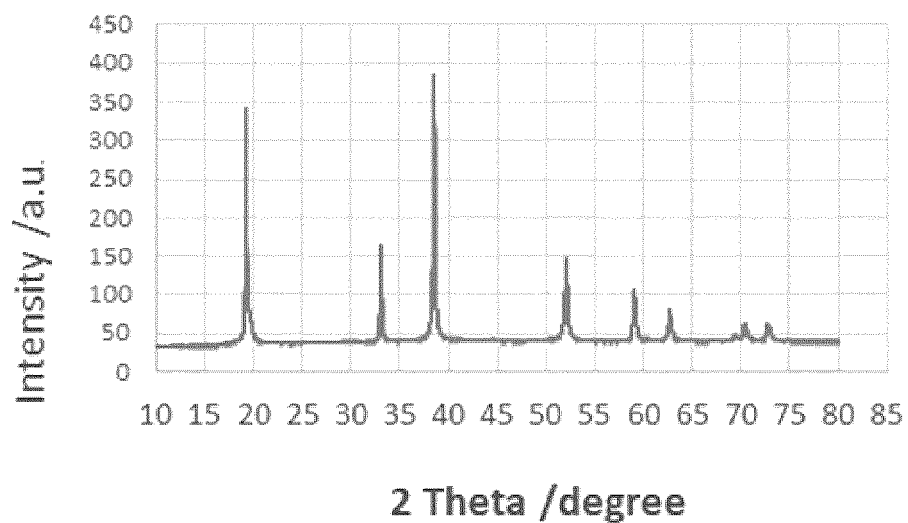
FIG. 2 is an XRD spectra of the precursor material produced using the invented process.

SEM/EDX (Scanning Electron Microscopy with an energy-dispersive X-ray) cross-section examination of the collected material indicated that all the targeted metal elements were uniformly distributed inside each precursor particles. X-ray Diffraction (XRD) spectra results, as shown in FIG. 2, also indicated a single phase of the obtained product.

Example 2

Similar to Example 1, an aqueous solution of about 1.2 L was prepared and transferred into a 2 liter reaction vessel. The aqueous solution contained about 1M ammonium nitrate and 0.5M sodium nitrate. The solution was agitated at a stir speed about 700 rpm while heating to a temperature of about 60° C. The temperature was maintained by a heating mantle integrated with a temperature controller and a J-type thermocouple. Then pH of the aqueous solution was adjusted to about 10.0, at 60° C., by adding ammonia to the reaction vessel.

About 135 grams of nickel metal powder and 15 grams metal cobalt powder were added into the reaction vessel. Further, about 150 grams mixed metal hydroxide powder, as nickel hydroxide and cobalt hydroxide, was also added into the reaction vessel, wherein the mixed metal hydroxide powder contained nickel and cobalt with an atom ratio of roughly 0.9:0.1.

After about 60 minutes, 7.2 grams nickel metal powder and 0.8 grams cobalt metal powder was added into the reaction vessel hourly. Further, about 2% aluminum was also added in the form of aluminium nitrate which aluminium nitrate was prepared by dissolving aluminium hydroxide into 68% nitric acid. Nitric acid and oxygen were also introduced simultaneously into the reaction vessel at flow rates of 0.04 ml/min and 18 ml/min, respectively.

Sampling was done every three hours by collecting 100 ml slurry samples. A magnetic separation was conducted, and the magnetic portion was returned back to the reaction vessel. The non-magnetic portion was filtered and washed by distilled water, and all of the filtrate, together with the wash water, was returned back to the reaction vessel.

The solid cake from the filtration operation, as the precursor, was dried at about 100° C. for about six hours.

The above sampling operations were repeated continuously for 100 hours, and the dried solid collected from last 24 hours operation was used as a good sample of the precursor material. Chemical analysis results indicated that the chemical composition of the product reached a steady state with the targeted atom ratio of Ni:Co:Al=0.865:0.097:0.038.

Example 3

About 6 grams of lithium hydroxide monohydrate was selected, and grained manually using a mortar to reduce the size of the particles. About 1 gram of this grained lithium hydroxide monohydrate was then mixed with 2 grams of precursor material collected from Example 1, and the mixture was transferred into an alumina crucible. The mixture was calcinated in a tubing furnace. Oxygen gas with flow rate of about 220 mL per minute passed through the tubing furnace all the time during the calcination.

The temperature was increased at a rate of 10° C. per minute up to 800° C. The temperature was held at 800° C. for 10 hours and then decreased at a rate of about 5° C. per minute. The solid collected after the calcination treatment was grained manually in order to break the agglomeration, and this material was then placed into a beaker containing about 30 mL cold water having a temperature of about 5° C. After about 2 minutes stirring, the mixture was quickly filtered, and the collected solid was put into an alumina crucible and again calcined in a tubing furnace at temperature about 710° C., for 5 hours. The resultant calcined solid composition was collected as the final cathode active product.

Example 4

A coin-type battery half-cell test was conducted using the final cathode active product collected from example 3, as the cathode active material, and using lithium metal foil as the anode active material. The cathode electrode was prepared with components of 90% final cathode active product, 6% carbon black and 4% PVDF (Polyvinylidene fluoride). The electrolyte used in the test was 1 M LiPF$_6$ in EC (ethylene carbonate), DEC (diethyl carbonate) and EMC (ethyl methyl carbonate) with an EC/DEC/EMC volume ratio of 1:1:1. First Charge and first discharge voltage was between 3 V to 4.3V with a rate of 0.05 C (where 1 C=150 mAh/g)).

Figure 3:
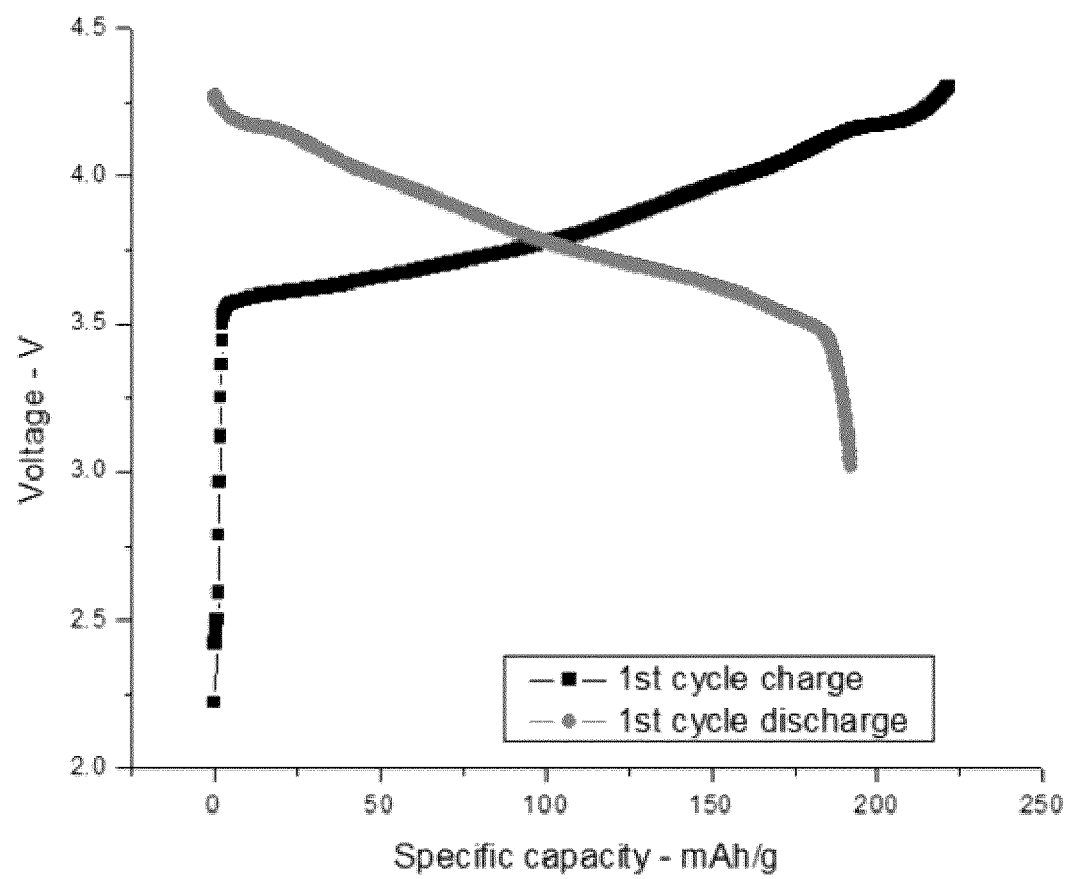
FIG. 3 is a graph of the charge and discharge curves in a half cell test for the final cathode active material produced by using the invented process.

FIG. 3 shows the results of charge and discharge curves for the first cycle of the test. The first discharge capacity was about 192 mAh/g with a columbic efficiency about 88%.

Thus, it is apparent that there has been provided, in accordance with the present invention, a process, product and battery, which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

The invention claimed is:

1. A process to produce a lithium mixed metal oxide cathode active material for use in lithium ion batteries comprising:
- in a precursor preparation step, adding solid metal particles of selected metals to a reaction system containing a mixture comprising the solid metal particles, an aqueous solution, and at least one oxidant, under alkaline conditions to form a slurry comprising a precursor product and unreacted metals, wherein the selected metals are selected from the group consisting of nickel, manganese, cobalt, aluminum, and magnesium;
- in a recycling step, separating the unreacted metals from the slurry to form a first solution and collected unreacted metals, separating the precursor product from the first solution to form a second solution and a collected precursor product, and recycling the collected unreacted metals and the second solution directly to the reaction system; and
- in a lithiation step, mixing the collected precursor product with lithium-containing compounds to produce a final mixture, and calcining the final mixture to obtain a lithium mixed metal oxide cathode active material;
- wherein the mixture of the precursor preparation step further comprises seed metal hydroxide particles.

2. The process of claim 1, wherein the precursor preparation step is performed at a pH in a range of between 7.5 to 13, and a temperature in a range of between 20° C. to the boiling point of the slurry.

3. The process of claim 2, wherein the precursor preparation step further comprises adding at least one of sulfuric acid, nitric acid, acetic acid, lithium hydroxide or oxide, sodium hydroxide, sodium oxide, potassium hydroxide, potassium oxide, and ammonia to the mixture.

4. The process of claim 1, wherein the aqueous solution further comprises dissolved salts.

5. The process of claim 1, wherein the aqueous solution further comprises a complexing agent.

6. The process of claim 1, wherein the oxidant is selected from the group consisting of air, oxygen, metal nitrates, nitric acid, and combinations thereof.

7. The process of claim 1, wherein the oxidant comprises oxygen.

8. The process of claim 1, wherein the reaction system comprises at least one agitated tank.

9. The process of claim 1, wherein the precursor preparation step is performed under steady state conditions and continuous operation.

10. The process of claim 9, wherein each individual metal element of the selected metals is added continuously at the same ratio to produce the precursor product with a uniform element distribution in each particle of the precursor product.

11. The process of claim 1, wherein at least 90% of the second solution is directly recycled to the reaction system.

12. The process of claim 1, wherein solid particles with the same or similar compositions as the precursor product, and a smaller particle size than the precursor product, are introduced into the reaction system during the precursor preparation step.

13. The process of claim 1, wherein an artificial solution with the same or similar composition as the aqueous solution is used in the precursor preparation step until a suitable second solution is generated from the recycling step and recycled to the reaction system.

14. The process of claim 1, further comprising drying the collected precursor product.

15. The process of claim 14, wherein the lithium mixed metal oxide cathode active material is subjected to a size reduction operation.

16. The process of claim 1, wherein the lithium-containing compounds are selected from lithium hydroxide and lithium carbonate.

17. The process of claim 1, wherein the final mixture is calcined at a temperature of from 600° C. to 1100° C.

18. The process of claim 1, wherein the lithium mixed metal oxide cathode active material is subjected to a further treatment selected from washing, coating, and combinations thereof.

19. The process of claim 1, wherein the seed metal hydroxide particles comprise at least one ionic metal selected from the group consisting of nickel, manganese, cobalt, aluminum, magnesium, zirconium, yttrium, titanium, vanadium and molybdenum.

20. A process to produce a lithium mixed metal oxide cathode active material for use in lithium ion batteries comprising:
- in a precursor preparation step, adding solid metal particles of selected metals to a reaction system containing a mixture comprising the solid metal particles, an aqueous solution, and at least one oxidant, under alkaline conditions to form a slurry comprising a precursor product and unreacted metals, wherein the selected metals are selected from the group consisting of nickel, manganese, cobalt, aluminum, and magnesium;
- in a recycling step, separating the unreacted metals from the slurry to form a first solution and collected unreacted metals, separating the precursor product from the first solution to form a second solution and a collected precursor product, and recycling the collected unreacted metals and the second solution directly to the reaction system; and
- in a lithiation step, mixing the collected precursor product with lithium-containing compounds to produce a final mixture, and calcining the final mixture to obtain a lithium mixed metal oxide cathode active material;
- wherein solid particles with the same or similar compositions as the precursor product, and a smaller particle size than the precursor product, are introduced into the reaction system during the precursor preparation step.

* * * * *